United States Patent [19]

Whittenberger

[11] Patent Number: 5,177,961
[45] Date of Patent: Jan. 12, 1993

[54] UPSTREAM COLLIMATOR FOR ELECTRICALLY HEATABLE CATALYTIC CONVERTER

[75] Inventor: William A. Whittenberger, Ravenna, Ohio

[73] Assignee: W. R. Grace & Co.-Conn., New York, N.Y.

[21] Appl. No.: 722,607

[22] Filed: Jun. 26, 1991

[51] Int. Cl.⁵ .............................................. F01N 3/28
[52] U.S. Cl. .................................. 60/300; 422/174; 422/176
[58] Field of Search ............... 60/300; 422/171, 174, 422/176

[56] References Cited

U.S. PATENT DOCUMENTS

| | | | |
|---|---|---|---|
| 3,719,457 | 3/1973 | Nagamatsu | 422/171 |
| 3,723,070 | 3/1973 | Houdry . | |
| 3,768,982 | 10/1973 | Kitzner . | |
| 3,770,389 | 10/1973 | Kitzner . | |
| 3,857,680 | 12/1974 | Porta . | |
| 3,886,739 | 6/1975 | Lee | 60/286 |
| 3,889,464 | 6/1975 | Gardner | 60/286 |
| 3,916,057 | 10/1975 | Hatch | 428/236 |
| 3,992,330 | 11/1976 | Noakes et al. . | |
| 4,015,566 | 4/1977 | Wahl . | |
| 4,023,928 | 5/1977 | Haensel | 21/74 R |
| 4,029,974 | 6/1977 | Brokaw | 307/296 R |
| 4,078,379 | 3/1978 | Minami et al. | 60/276 |
| 4,102,127 | 7/1978 | Saiki et al. | 60/284 |
| 4,186,172 | 1/1980 | Scholz | 422/180 |
| 4,272,668 | 6/1981 | Johnson et al. | 219/375 |
| 4,277,442 | 7/1981 | Hergert | 422/119 |
| 4,381,590 | 5/1983 | Nonnenmann . | |
| 4,414,023 | 11/1983 | Aggen | 75/124 |
| 4,598,063 | 7/1986 | Retallick | 502/439 |
| 4,693,078 | 9/1987 | Dettling et al. | 60/295 |
| 4,702,892 | 10/1987 | Betz | 422/171 |
| 4,711,009 | 12/1987 | Cornelison et al. . | |
| 4,847,966 | 7/1989 | Kuchelmeister . | |
| 4,852,530 | 8/1989 | John | 123/145 A |
| 4,928,485 | 5/1990 | Whittenberger | 422/180 |
| 5,065,576 | 11/1991 | Kanazawa | 422/176 |

FOREIGN PATENT DOCUMENTS

| | | |
|---|---|---|
| 2333092 | 1/1975 | Fed. Rep. of Germany ...... 422/174 |
| WO89/10470 | 11/1989 | Fed. Rep. of Germany . |
| WO89/10471 | 11/1989 | Fed. Rep. of Germany . |

OTHER PUBLICATIONS

"Recent Developments in Electrically Heated Metal Monoliths", Whittenberger et al.; SAE Technical Paper Series 90053, Feb. 26, 1990.
Analog Devices: "Thermocouple Conditioner and Set Point Controller", AD596/AD597, Jun. 1991.
Motorola Semiconductor Technical Data MC68H811A2, Jun. 1991.
Abstract of DE3446342, Jun. 26, 1986.
Abstract of DE3731888, Apr. 13, 1989.
Allied Metglas Products—Catalogue Sheet—Jun. 1991.

Primary Examiner—Douglas Hart
Attorney, Agent, or Firm—Edward J. Cabic

[57] ABSTRACT

There is provided an improved electrically heatable catalytic converter formed of an electrically heatable corrugated thin metal monolith and having a collimator axially spaced upstream of the electrically heatable monolith, said collimator having the purpose of straightening and subdividing the gas flow to minimize the tendency of the leading edges of the corrugated thin metal monolith to be folded over in use.

4 Claims, 5 Drawing Sheets

UPSTREAM COLLIMATOR FOR ELECTRICALLY HEATABLE CATALYTIC CONVERTER

This invention relates, as indicated, to a collimator or "diffuser" for an electrically heatable catalytic converter, and more particularly, to a device which subdivides the gas flow stream and, in the preferred case, aligns segments of the gas stream prior to entry into an electrically heatable catalytic converter.

BACKGROUND OF THE INVENTION AND PRIOR ART

The purpose of a catalytic converter is to convert pollutant materials in engine or turbine exhaust, e.g., carbon monoxide, unburned hydrocarbons, nitrogen oxided, etc., to carbon dioxide, nitrogen and water. Conventional catalytic converters utilize a ceramic honeycomb monolith having square, circular, or triangular straight-through openings or cells, with catalyst deposited on the walls of the cells, catalyst coated refractory metal oxide beads or pellets, e.g., alumina beads, or a corrugated thin metal foil monolith, e.g., a ferritic stainless steel foil having a catalyst carried on or supported by the surface. The catalyst is normally a noble metal, e.g., platinum, palladium, rhodium, ruthenium, or a mixture of two or more of such metals. The catalyst catalyzes a chemical reaction, mainly oxidation, whereby the pollutant is converted to a harmless by-product which then passes through the exhaust system to the atmosphere.

However, conversion is not efficient initially when the exhaust gases are relatively cold. To be effective at a high conversion rate, the catalyst and the surfaces of the converter with which the gases come in contact must be at a minimum temperature, e.g., 390 F. for carbon monoxide, 570 F. for volatile organic compounds (VOC) and 1000 F. for methane or natural gas. Otherwise, conversion to harmless by-products is poor and cold start pollution of the atmosphere is high. Once the exhaust system has come to its operating temperature, the catalytic converter is optimally effective. Hence, it is necessary to contact relatively cold exhaust gases with hot catalyst to effect satisfactory conversion at engine start-up. Both compression ignited (diesel) and spark ignited engines have this need.

To achieve initial heating of the catalyst prior to engine start-up, there is provided an electrically heatable catalytic converter formed of a corrugated thin metal monolith which is connected to a voltage source, e.g., a 12 volt to 108 volt automotive battery, and power supplied, preferably before, during, and possibly after start-up, to elevate and maintain the temperature of the catalyst to at least 650 F. plus or minus 20 F.

Copending application Ser. No. 587,219 filed Sep. 24, 1990 and its parent case Ser. No. 524,284 filed Apr. 16, 1990, disclose one form of electrically heatable catalytic converter which has been found to be subject to telescoping of the core, and each provides a means for offsetting the tendency to telescoping of the core in operation and ultimate destruction thereof under Hot Shake automotive tests. The disclosure of Ser. No. 587,219 is incorporated herein by reference thereto. Reference may also be had to Ser. No. 626,672 filed Dec. 12, 1990 which discloses a further improvement in resistance to telescoping by brazing between contiguous leaves whereby the leaves or convolutions are held against telescoping or axial displacement. The foregoing applications are commonly owned with the present application.

Copending application Ser. No. 606,130 filed Oct. 31, 1990 by William A. Whittenberger and entitled Electrically Heatable Catalytic Converter, and commonly owned with the present application, discloses a means for preventing telescoping of a spiral or S-wound corrugated thin metal foil monolith by brazing between the corrugated leaves according to a pattern (staggered relation). In that application, all of the leaves forming the monolith are corrugated. The adjacent leaves or strips are in nonnesting relationship by virtue of (1) pattern corrugations, such as herringbone corrugations, or (2) straight-through corrugations using corrugated leaves with straight cells of differing pitch. (See U.S. Pat. No. 4,810,588 dated Mar. 7, 1989 to Bullock)

This application also comtemplates the use of a collimator device in combination with reinforced foils such as disclosed in co-pending application Ser. No. 696,132 filed May 6, 1991, commonly owned with the present application. In Ser. No. 696,132, at least one longitudinal edge, optionally both longitudinal edges, of the foil is folded over through 180 degrees a distance of from 5% to 25% of the final width of the strip prior to corrugation to reinforce the edge and reduce the tendency to folding over under the Hot Shake Test.

Reference may be had to U.S. Pat. No. 4,381,590 dated May 3, 1983 to Nonnenmann et al which discloses a spirally wound monolith made up of corrugated and flat continuous strips which are brazed together. No collimator device such as here employed, is disclosed. However, the basic regular uniform pitch corrugated foil strip backed up with a flat strip and spirally wound, as described therein, may be used herein.

Reference may also be had to U.S. Pat. No. 3,768,982 to Kitzner dated Oct. 30, 1973. In this patent, heat from a centrally located electric heater is transferred by conduction through a monolithic catalyst support to heat the catalyst to a desired temperature. Reference may also be had to U.S. Pat. No. 3,770,389 to Kitzner dated Oct. 30, 1973 which discloses a central electrically heated core within a ceramic monolith, heat being transmitted by conduction to the catalyst contained in the openings of the ceramic monolith. The heating core is formed of metal sheets, one corrugated, the other flat, coated with alumina and bearing a catalyst. The metallic core is heated electrically by virtue of its own electrical resistance. Heating of the ceramic core by conduction takes too long to solve the problem of atmospheric pollution at start-up. The metallic cores are subject to telescoping under the conditions of the Hot Shake test.

The Hot Shake test involves oscillating (100 to 200 Hertz and 28 to 60 G inertial loading) the device in a vertical attitude at high temperature (between 700 and 950 C.; 1292 to 1742 F., respectively) with exhaust gas from a running internal combustion engine being passed through the device. If the electrically heatable catalytic device telescopes in the direction of gas flow or breaks up after a predetermined time, e.g., 5 to 200 hours, the device is said to fail the test. Usually, a test device will fail in 5 hours if it is going to fail. Five hours is equivalent to 1.8 million cycles at 100 Hertz.

Reference may also be had to U.S. Pat. No. 4,711,009 to Cornelison et al dated Dec. 8, 1987 for details of a process for corrugating thin metal foil strips. Brazing cannot be satisfactorily done over a refractory metal oxide coated and catalyst bearing surface. Hence, in the present case, the refractory metal oxide/catalyst coating must be removed from those regions of the strip undergoing brazing or spot welding, for example, by wire brushing. The corrugating of a thin metal foil strip with a herringbone or chevron pattern as taught therein is applicable to the present invention and hence, the disclosure of the aforesaid U.S. Pat. No. 4,711,009 is incorporated herein by reference. Alumina wash coating and catalyst application, using materials disclosed in U.S. Pat. No. 4,711,009, may be done after brazing by a dipping process, if desired.

Ordinarily the thickness of the foil strip has been in the range of from 0.001″ to 0.005″ with a preference for 0.0015″. It has been found that increasing the preferred thickness up to 0.0016″ to 0.0019″ aids in reducing the tendency to fold over under the Hot Shake Test. The corrugations generally have an amplitude of from 0.02″ to 0.25″ and a pitch of from 0.02″ to 0.2″. The cross-sectional shape of the corrugations may be triangular, truncated triangular, triangular with the apices rounded, wave-like, e.g., sinusoidal, etc. The pattern of corrugation may be herringbone or chevron with a slope of from 3 degrees to 10 degrees to a line perpendicular to the edges of the foil strip, or they may be straight through according to a variable pitch pattern (Bullock et al, supra) or if, the foil is to be backed up with a flat foil strip, a uniform straight-through pattern with the corrugations lying along lines perpendicular to the longitudinal edges of the foil strip. Generally the pitches at the higher end of the range, e.g., 0.1 to 0.15″ are desired in the present case.

Reference may also be had to International PCT publication numbers WO 89/10471 and WO 89/10470 each filed Nov. 2, 1989. S-wound cores composed of corrugated and flat strips in alternating relation are disclosed in these publications. However, there is no teaching of the use of a collimator device therein, and telescoping of the core can occur under the conditions of the test described above.

In the following description, reference will be made to "ferritic" stainless steel. A suitable formulation for this alloy is described in U.S. Pat. No. 4,414,023 to Aggen dated Nov. 8, 1983. A specific ferritic stainless steel useful herein contains 20% chromium, 5% aluminum, and from 0.002% to 0.05% of at least one rare earth metal selected from cerium, lanthanum, neodymium, yttrium, and praseodymium, or a mixture of two or more thereof, balance iron and trace steel making impurities.

In the following description, reference will also be made to fibrous ceramic mat or insulation. Reference may be had to U.S. Pat. No. 3,795,524 dated Mar. 5, 1974 to Sowman for formulations and manufacture of ceramic fibers and mats useful herein. One such ceramic fiber material is currently commercially available from 3-M under the registered trademark "INTERAM."

Electrically heatable catalytic converters of the spirally wound type exhibit two types of mechanical failure when subjected to automobile durability tests, such as, the "hot shake" test. Telescoping failure can be largely eliminated by proper design of the monolith, such as shown, for example, in commonly owned co-pending application Ser. No. 626,672 filed Dec. 12, 1990, the disclosure of which is incorporated herein by reference. The second type of failure, which is called "face separation," is a condition where face portions of successive convolutions of a spirally wound metal monolith bend over and/or part under the influence of high speed gas flow and tend to obstruct gas flow. This condition is not acceptable.

It has been found that by positioning a protective element just upstream, i.e., axially within from 0.1 inch plus or minus 0.05 inch to 1.5 inch plus or minus 0.2″ hereinafter "from about 0.1 inch to about 1.5 inch," face separation can be eliminated. The protective element straightens out and evens the fluid flow pattern presented to the face of the electrically heatable catalytic converter, hereinafter "EHC," so that only axial forces act on the EHC. Thus, bending or folding of the leading edges of the foil convolutions is avoided.

BRIEF STATEMENT OF THE INVENTION

Briefly stated, the present invention is an improved catalytic converter for an exhaust stream comprising an electrically heatable catalytic converter comprising (a) a corrugated thin metal polycellular monolith, said monolith having an upstream gas intercepting face, a plurality of gas transmitting cells opening in said face, and a catalyst deposited on the gas contacting surfaces of said cells, and (b) a collimator for said exhaust stream axially spaced upstream of said gas intercepting face whereby the gas flow is straightened and subdivided prior to entry into the corrugated thin metal polycellular monolith.

The collimator may be a corrugated thin metal monolith, preferably with straight-through cells as shown in Nonnenmann et al, supra. Alternatively, a metal plate from approximately ⅛th inch thick to about ⅜ths inch thick pierced with many holes may be used. Also, it has been found that a coarse porous ceramic plate such as produced by Selee Corp. of Hendersonville, NC, may be used with satisfactory results. The corrugated thin metal monolith collimator and the porous ceramic plate are from ½ to 1½ inch thick plus or minus ⅛ inch, or "about" ½ to about 1½ inch thick. Collimators of expanded metal or wire cloth may be used. The collimators hereof may also include a catalyst carried within the cells thereof.

BRIEF DESCRIPTION OF THE DRAWINGS

The invention may be better understood by having reference to the annexed showing several embodiments of the invention and wherein.

DETAILED DESCRIPTION OF THE DRAWINGS

As indicated above, the present invention provides a different means for inhibiting "fold-over failure," or "face separation" of the leading edges of corrugated thin metal foil monoliths under the severe "Hot Shake Test" described above. Instead of reinforcing the leading edge and optionally the trailing edge of the foil strips as described in copending application Ser. No. 696,132 filed May 6, 1991, a different means operative on the gas stream is provided. Normally, the exhaust gas stream is highly turbulent, twisting and moving at a high velocity. The purpose of the present invention is to break up the turbulent stream into smaller streams, desirably axially flowing, prior to entry into the EHC monolith. In this way, the forces tending to overfold the leading edge, for example, of the corrugated thin metal monolith are minimized and rendered ineffective to cause overfolding, and the resulting device is able to pass the "Hot Shake Test."

Figure 1:
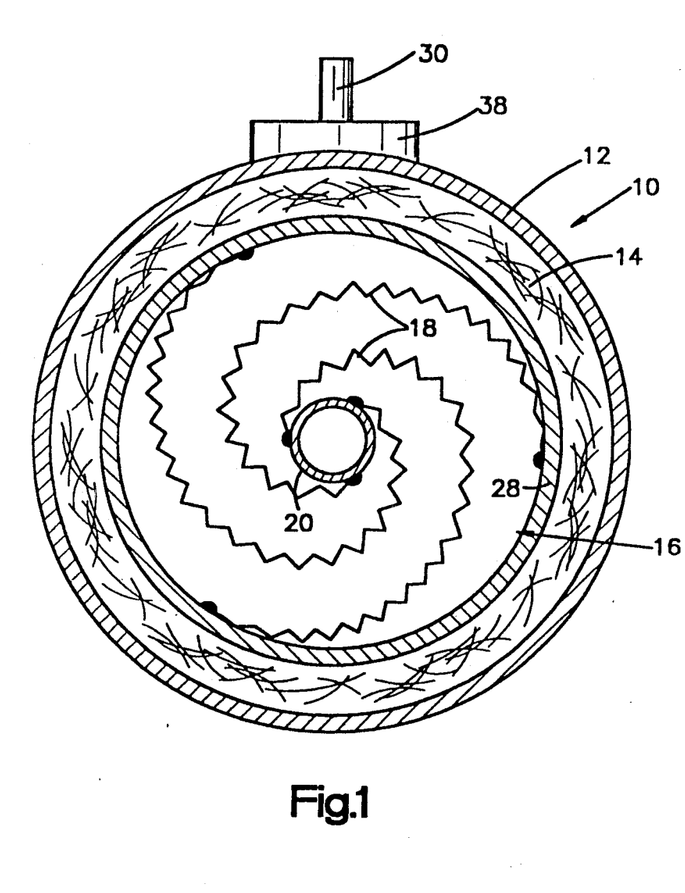
FIG. 1 is a front cross-sectional view of a current EHC without a collimator as it appears in the plane indicated by the line 1—1 in FIG. 2.
Figure 2:
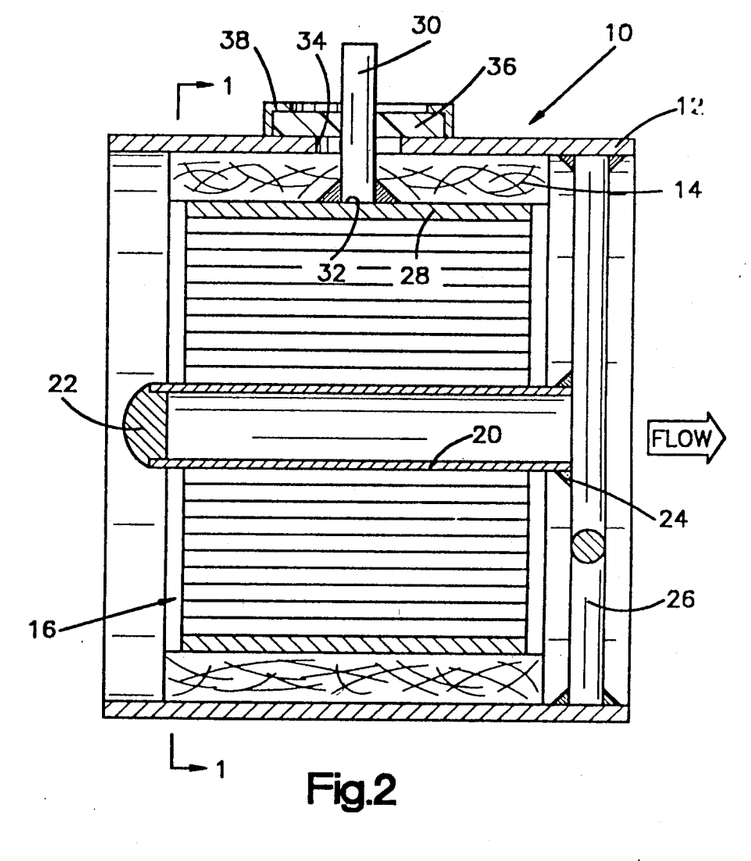
FIG. 2 is an axial cross sectional view of the converter of FIG. 1 without a collimator.

Referring now to FIGS. 1 and 2, there is here shown in transaxial and axial cross-section, respectively, partial views of an EHC, wherein parts not essential for full understanding of the present invention, e.g., end caps and adapters for the exhaust pipe, negative terminal, etc. are omitted. For a full view of an EHC in accordance with this invention, reference may be had to FIG. 9 of the drawings. FIGS. 1 and 2 do not show modification of the device in accordance with this invention, showing instead a basic EHC prior to modification hereunder.

Figure 9:
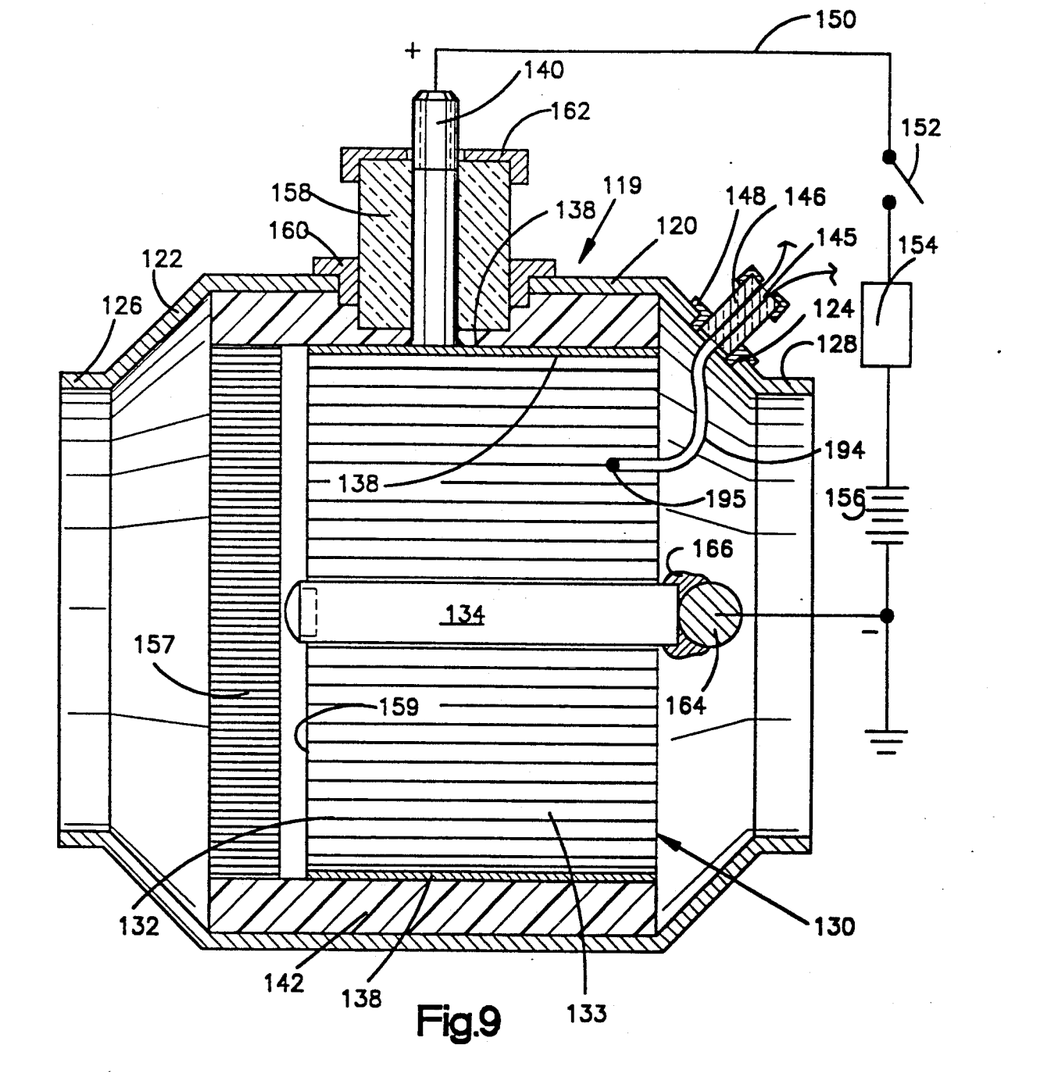
FIG. 9 is an axial cross-sectional view of an EHC in accordance with this invention.

In FIGS. 1 and 2, there is shown an EHC generally indicated at 10 having a housing 12, an inner layer of fibrous ceramic mat 14 and a core 16. The core 16 is formed of a plurality of core elements 18 of corrugated thin ferritic stainless steel welded to and spirally wound about a central tubular post 20 plugged at one end with a plug 22. The post is provided at its downstream end 24 with a diametral bar 26 welded to the post 20 and at its ends to the housing 12 and to which a cable (not shown) from the negative side of a voltage source (not shown) may be attached. The bundle of spirally wound core elements 18 is retained in a stainless steel or nickel retainer 28 welded or brazed to the free ends of the core elements 18. There is also shown a terminal post 30 welded at its inner end 32 to the outside of the retainer or shell 28, extending through an opening 34 in the housing 12 and suitably insulated therefrom by a ceramic sleeve 36 and retained by a flange 38 welded to the housing 12. A better form providing for the positive terminal is shown in FIG. 9, the forms shown in FIGS. 1-8 being simplified for illustrative purposes. When power is supplied across the positive and negative terminals, from a direct current voltage source, the core 16 is electrically heated. A suitable power supply and control system is fully described in copending application Ser. No. 587,219 supra.

Figure 3:
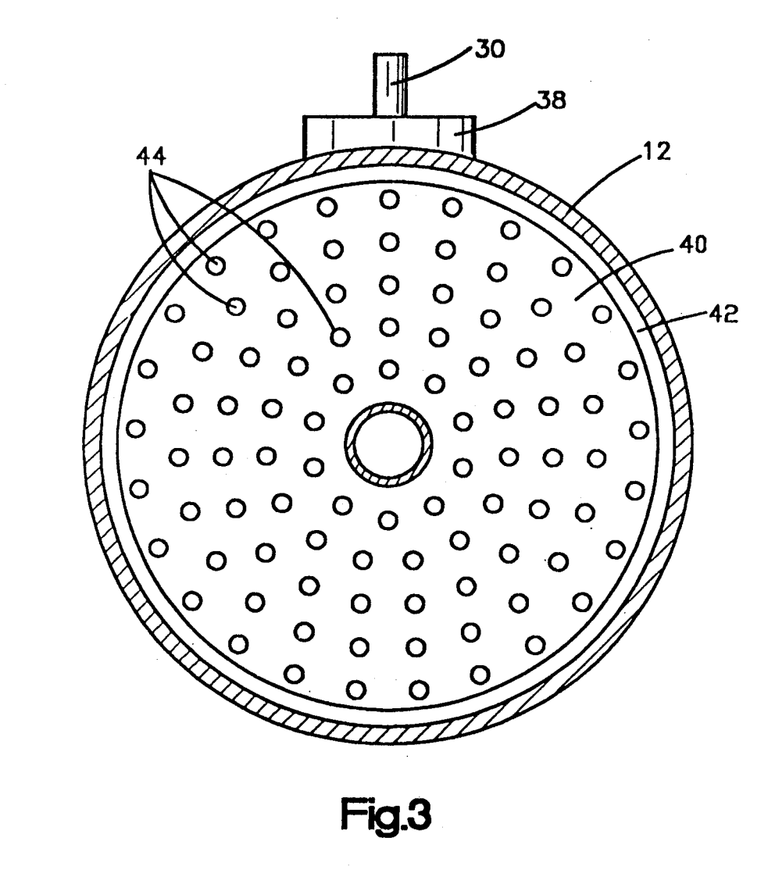
FIG. 3 is a front cross-sectional view of the EHC of FIG. 1 with a drilled plate collimator in place upstream of the EHC as it appears in the plane indicated by the line 3—3 in FIG. 4.

FIG. 3 is a front cross-sectional view of an EHC such as shown in FIGS. 1 and 2 fitted with a drilled plate collimator. Like parts will be identified with the same numbers as in FIGS. 1 and 2. In FIG. 3, there is shown in front elevational view a stainless steel or nickel plate type collimator 40 circumferentially welded to the housing 12 as at 42. The collimator 40 is 1/16th" to ¼" thick, preferably ⅛" thick, and has a plurality of holes 44 drilled therethrough. These may be randomly drilled or drilled on concentric circles. The holes are from 1/16th inch to 3/16th inch in diameter plus or minus 1/32 inch. With the plate 40 welded in place, there is no need for the bar 26 as shown in FIG. 2. One pole of the voltage source is connected to the chassis of the vehicle and thus indirectly to the EHC, or directly to the housing 12. The open area of the drilled plate is at least 50%.

Figure 4:
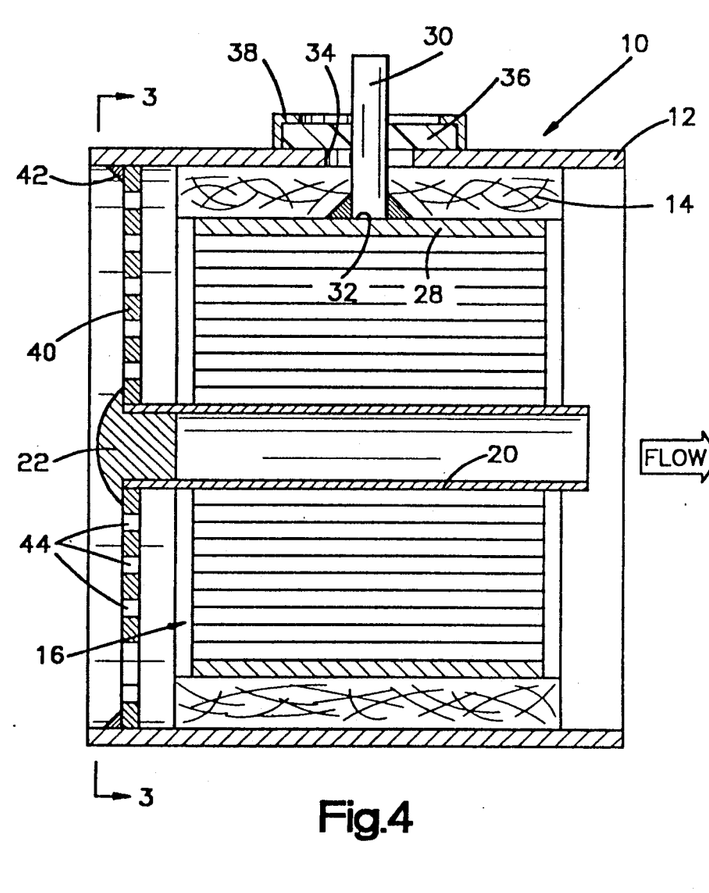
FIG. 4 is an axial cross-sectional view of the converter of FIGS. 1 and 2 with the drilled plate collimator in place upstream of the EHC.
Figure 5:
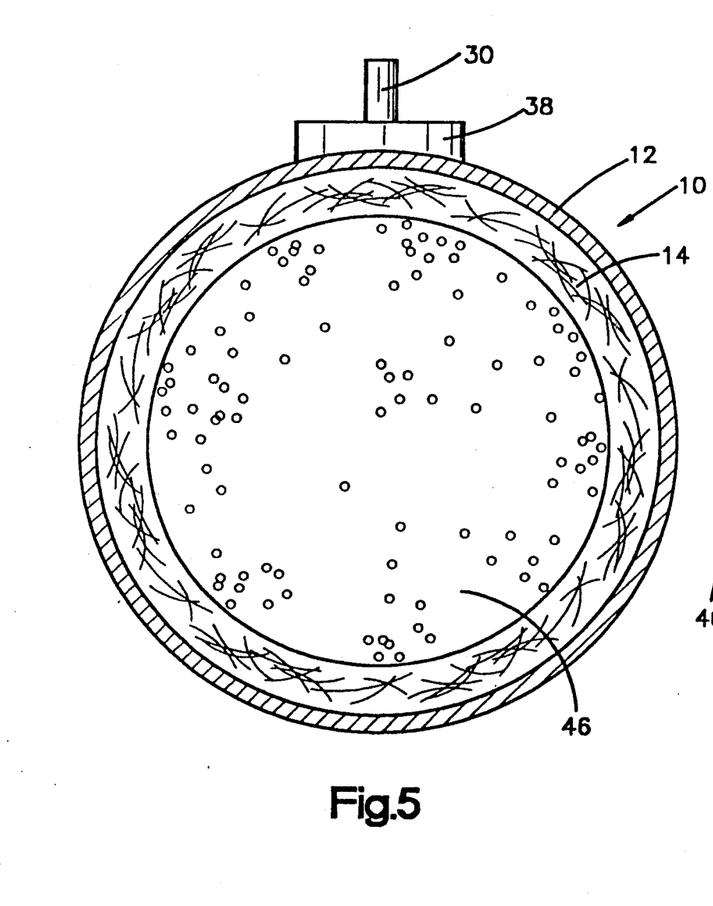
FIG. 5 is a front cross-sectional view of the EHC of FIG. 1 with a porous ceramic plate collimator in place upstream of the EHC as it appears in the plane indicated by the line 5—5 in FIG. 6.
Figure 6:
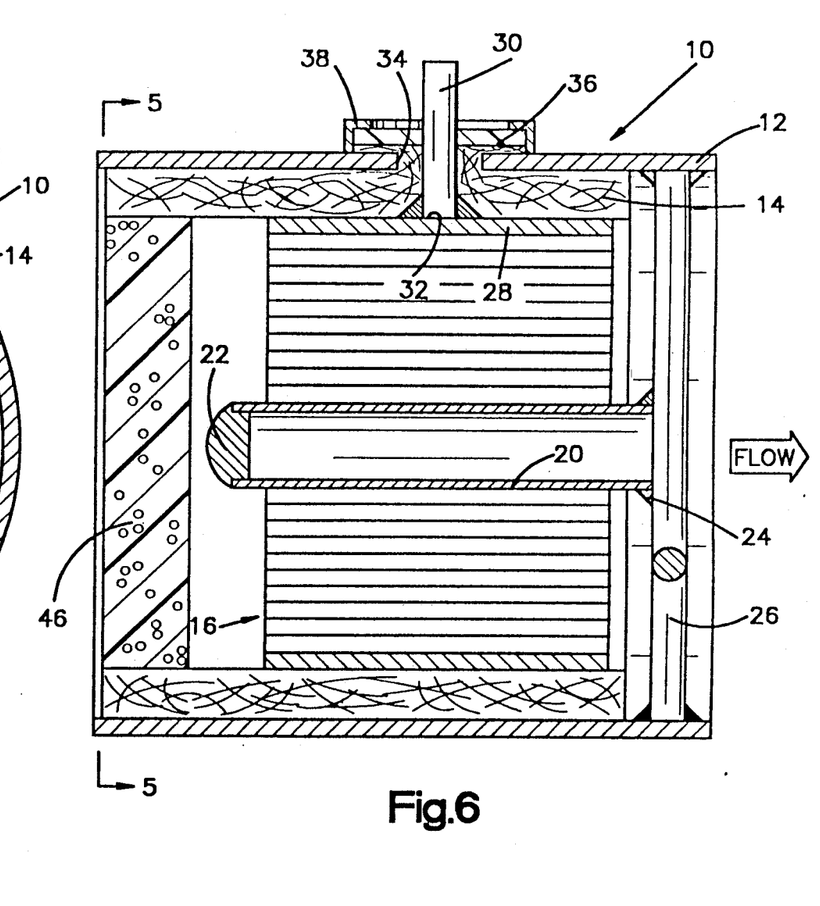
FIG. 6 is an axial cross-sectional view of the EHC of FIGS. 1 and 2 with a porous ceramic collimator in place upstream of the EHC.

FIGS. 5 and 6 show another embodiment of the present invention utilizing a porous ceramic collimator. Thus, there is provided a porous ceramic collimator 46. This collimator may be a commercial ceramic foam currently available from Selee Corp., supra, having a range of pore sizes from, for example, 0.01" to 0.15" in diameter in a single block. As shown in FIG. 5, the block is circular although it may be oval, square, or any geometric configuration desired. Instead of a porous ceramic foam, the ceramic collimator may be a section of a conventional ceramic converter body which is usually formed by extrusion, and which has straight-through cells of circular, hexagonal, square, triangular, rectangular, or other geometric cross-section. The block in either case has an axial thickness of from 0.5 to 1.5", e.g., 1.0". A noble metal catalyst may be deposited in the pores and cells of either the ceramic foam, or the extruded ceramic core. As in FIGS. 2 and 4, the direction of gas flow is indicated by the arrow in FIG. 6. In order to convey power to the inside of the core 16, there must be provided suitable means, such as the diametral bar 26 welded to the central post 20, capped with the plug 22. Power is supplied to the housing 12 indirectly through the chassis or directly through a cable, (not shown) attached to a suitable terminal (not shown) directly attached to the housing 12. The ceramic collimator is set directly in the ceramic mat 14. The EHC components are the same as indicated in FIG. 2.

Figure 7:
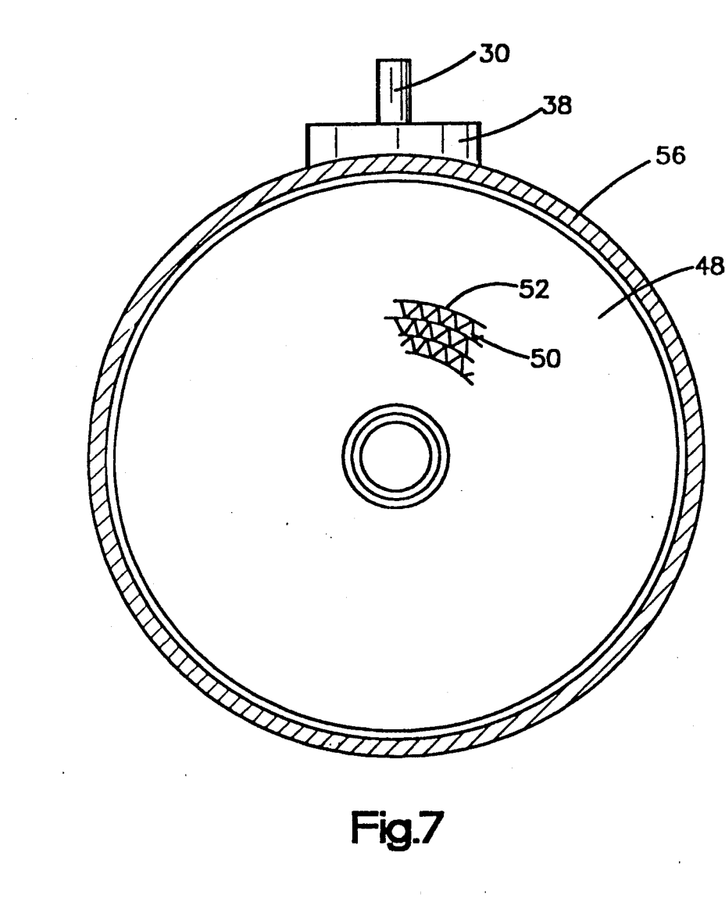
FIG. 7 is a front cross-sectional view of the EHC of FIG. 1 with a corrugated thin metal monolith collimator in place upstream of the EHC as it appears in the plane indicated by the line 7—7 in FIG. 8.
Figure 8:
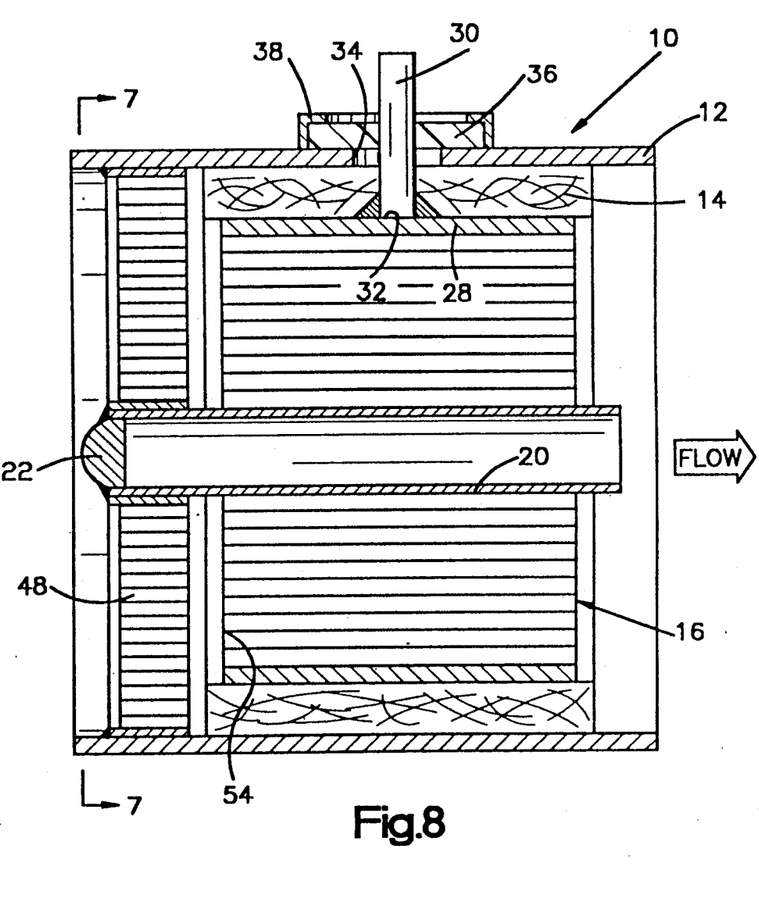
FIG. 8 is an axial cross-sectional view of the EHC of FIGS. 1 and 2 with a corrugated thin metal monolith collimator in place upstream of the EHC.

FIGS. 7 and 8 show another embodiment of the present invention wherein the collimator is in the form of a corrugated thin metal monolith 48. This collimator 48 may be of the same structure as the core 16 of FIGS. 1 and 2 or, as shown in FIG. 7, a composite core or alternating corrugated thin metal strips 50 and flat metal strips 52, preferably brazed together. The collimator is, again, from about ½ to about 1½" thick in an axial direction. It completely covers the gas intercepting face 54 of the EHC core 16. The collimator is provided with a steel retaining shell 56 which is circumferentially welded or brazed to the housing 12. The central core 20 is axially extended in FIG. 8 to and through the collimator 48 and is welded thereto. Because the collimator element 48 being all metal is electrically conducting, there is no need for the current carrying diametral bar 26 shown, for example, in FIGS. 2 and 6. However, a bar 26 may be found desirable for mechanical support.

FIG. 9 shows a complete EHC assembly embodying the ceramic collimator of FIGS. 5 and 6. FIG. 9 is an axial cross-section of a completely assembled EHC generally indicated at 119, in accordance herewith and adapted to be inserted in an exhaust line from an internal combustion engine. The converter is provided with a stainless steel or nickel housing 120 having flared end caps 122 and 124, and nipples 126 and 128 integral therewith adapted to accommodate a standard exhaust pipe, e.g., a 2.5" internal diameter pipe. The housing 120 contains a corrugated thin metal monolith indicated at 130 such as, for example, a monolith such as shown in FIG. 6 with a collimator 157 in spaced axial relationship to the gas intercepting face 159 of the monolith 130. The monolith 130 can be formed in the manner indicated in co-pending application Ser. No. 680,763, filed Apr. 5, 1991 by Cornelison and Whittenberger. The core is a refractory metal oxide coated, e.g., alumina/ceria, corrugated thin ferritic stainless steel having a noble metal catalyst, e.g., platinum, deposited on the surface. The core 130 defines a plurality of generally axially extending cells 133 permeable to exhaust gas. Such cells 133 are diagrammatically shown as a plurality of parallel lines. As indicated above, these cells 133 non-straight-through as produced with a herringbone or chevron corrugation pattern, or straight-through variable pitch or uniform pitch as described in U.S. Pat. Nos. 4,810,588 and 4,381,590, supra. The refractory metal oxide coating is very thin, e.g., from 0.0005" to 0.002" applied as a washcoat and baked to fuse the coating to the stainless steel surface. The gamma form of alumina is desired. Other refractory metal oxides or mixtures of such oxides may be used as the washcoat, e.g., titania, titania/ceria, titania/alumina, alumina/ceria, etc. As indicated above, reference may be had to U.S. Pat. No. 4,711,009, supra, for a procedure for corrugating, washcoating, and application of a noble metal catalyst to the foil. Strips 132 of the corrugated ferritic stainless steel foil are cut to a predetermined length and 1 or more such strips 132 are secured to the central post 134 as by welding. A button 136 is provided to close the tube 134. The strips 132, which may be uniformly a corrugated strip or, a composite of two or more strips, e.g., corrugated and flat, or corrugated, flat and brazing, are then tightly wound about the central post 134 to which post 134 they are welded or brazed after removal of the refractory metal oxide coating in the area where welding or brazing occurs. The alumina coating must also be removed from the free ends of the strips 132. The whole bundle of spirally wound strips 132 is then wrapped in a strip of brazing foil, and a retaining shell 138, preferably as two half shells, one of which has a suitable terminal post 140 extending therefrom for attachment of a cable 150 from a suitable voltage source. The half shells are seam welded together. The assembly is heated to fusion temperature for the brazing strip to effect brazing to the retaining shell 138. If the brazing temperature, generally from 2100 to 2300 F., is found to be too high for the catalyst, application of the catalyst may be deferred until after the brazing step, and the catalyst subsequently applied by dipping and baking at a lower temperature.

This assembly is then wrapped in insulation 142 desirably 1/16 to ⅜" thick and inserted into the housing 120. The housing may, for convenience, be formed as half shells to be seam welded together. A suitable ceramic felt is described in U.S. Pat. No. 3,916,057 to Hatch dated Oct. 28, 1975. The insulation 142 extends axially a distance sufficient to accommodate the collimator 157 which is now put in place. The assembly is compressed and seam welded together. The end caps 122 and 124 are the last to be attached as by welding. A thermocouple having a junction 196 may optionally be placed within the core 130 to sense temperature. The leads 194 pass through an insulator 146 and a bushing 148 extending through the end cap 124.

The terminal post 140 extends through the housing 120 and is desirably threaded at its distal extemity to accept a nut (not shown) to attach a cable schematically shown at 150 leading through a switch 152 and a power switching means 154 such as described in copending application Ser. No. 587,219, supra. The power switching means 154 is connected to a battery 156 or an alternator, or both, to provide a driving force or voltage of from 12 to 108 volts. The post 140 is provided with an insulating sleeve 158, a bushing 160 and a metal cap 162 serving as a seat for the cable connector, not shown.

The opposite, or negative pole in this case, is connected from the outside of the housing 120 by a transversely extending, or diametral bar 164 welded at each end to the inside of the housing 120 and to which the central post 134 is welded as at 166. The chassis is grounded or negative. Thus, the electrical circuit is completed from the central post 134, through the corrugated foil, 130, through the retaining shell 138 and terminal 140.

The cell density is conveniently in the range of from 75 to 500 cells per square inch, desirably from 100 to 350 cells per square inch, and preferably from 125 to 200 cells per square inch.

The catalytic converters hereof are referred to as "electrically heatable." This is to suggest that electric power is supplied for a small portion of the time the engine is at rest prior to start-up, and if necessary, during operation at any time the temperature falls below a set point.

It has been found that inclusion of the collimators of the present invention and equivalent devices is very satisfactory for solving the problem of folding over, or face separation, and failure by reason of such damage to the core undergoing a severe automotive test such as the hot shake test described above.

What is claimed is:

1. An electrically heatable catalytic converter comprising (a) a corrugated thin metal polycellular monolith, said monolith having an upstream gas intercepting face, a plurality of gas transmitting cells opening in said face, and a catalyst deposited on the gas contacting surfaces of said cells, and (b) a porous ceramic disk collimator for said exhaust gas stream having gas transmitting openings of from 0.01" to 0.15" in diameter, said collimator being axially spaced upstream of said gas intercepting face, whereby the gas flow is straightened and subdivided prior to entry into the corrugated thin metal polycellular monolith.

2. An electrically heatable catalytic converter as defined in claim 1 wherein the ceramic disk is an extruded ceramic disk.

3. An electrically heatable catalytic converter as defined in claim 1 wherein the ceramic disk is an open pore cast ceramic disk.

4. An electrically heatable catalytic converter for treating exhaust gas emanating from an internal combustion engine to remove pollutant materials therefrom, said converter including (1) an outer metallic shell, (2) means at each end of said shell for adapting the configuration of the outer metallic shell for insertion into a conventional exhaust system for said internal combustion engine, (3) an insulating liner for the inner walls of said outer shell, (4) a core for said converter within said insulating liner including (5) a porous ceramic disk collimator having gas transmitting openings of from 0.01" to 0.15" in diameter, and axially spaced therefrom, (6) a core member comprising (a) at least one nonnesting corrugated thin stainless steel foil strip spirally wound about (b) an electrically conducting central metal post, and (c) a retaining shell tightly surrounding said core member and being electrically bonded thereto, (7) means for connecting said central post to one pole of a direct current voltage source, (8) means for connecting said retaining shell to the other pole of a direct current voltage source, and (9) a direct current voltage source rated at from 12 to 108 volts.

* * * * *